United States Patent [19]

Ozawa et al.

[11] Patent Number: 4,698,151
[45] Date of Patent: * Oct. 6, 1987

[54] DYESTUFF REFINING SYSTEM

[75] Inventors: Kunitaka Ozawa, Tokyo; Masahiro Haruta, Funabashi; Tsuyoshi Eida; Takashi Hamamoto, both of Yokohama, all of Japan

[73] Assignee: Canon Kabushiki Kaisha, Tokyo, Japan

[ * ] Notice: The portion of the term of this patent subsequent to May 12, 2004 has been disclaimed.

[21] Appl. No.: 795,707

[22] Filed: Nov. 6, 1985

Related U.S. Application Data

[63] Continuation of Ser. No. 603,756, Apr. 25, 1984, abandoned.

[30] Foreign Application Priority Data

Apr. 27, 1983 [JP] Japan .................................. 58-72980

[51] Int. Cl.$^4$ ........................................... B01D 15/08
[52] U.S. Cl. .............................. 210/96.1; 210/195.1; 210/196; 210/198.2; 106/20; 106/22; 106/23; 346/140 R
[58] Field of Search ............................ 106/20, 22, 23; 346/1.1, 75, 140 R; 210/656, 658, 96.1, 101, 167, 198.2, 198.3, 688, 681, 912, 744, 739, 917, 85, 96.2, 195.1, 196

[56] References Cited

U.S. PATENT DOCUMENTS

| | | | |
|---|---|---|---|
| 3,154,670 | 10/1964 | Gossel | 364/502 |
| 3,539,505 | 11/1970 | Lauer | 210/656 |
| 3,705,043 | 12/1972 | Zabiak | 106/20 |
| 3,705,044 | 12/1972 | Pipkins | 106/20 |
| 3,822,203 | 7/1974 | Annino | 210/656 |
| 3,846,141 | 11/1974 | Ostergren | 106/22 |
| 3,887,688 | 6/1975 | Shimosaka | 210/656 |
| 3,999,046 | 12/1976 | Porter | 235/151.1 |
| 4,003,892 | 1/1977 | Lohr | 210/656 |
| 4,058,517 | 11/1977 | Bermes | 260/155 |
| 4,127,475 | 11/1978 | Farcasiu | 210/656 |
| 4,159,203 | 6/1979 | Loock | 106/22 |
| 4,179,267 | 12/1979 | Lacruix | 8/41 R |
| 4,196,006 | 4/1980 | Mansukhani | 106/22 |
| 4,290,812 | 9/1981 | Loock | 106/22 |
| 4,340,389 | 7/1982 | Nonn | 8/620 |
| 4,373,954 | 2/1983 | Eida et al. | 106/20 |
| 4,381,946 | 5/1983 | Uehara | 106/22 |
| 4,396,429 | 8/1983 | Matsumoto | 106/20 |
| 4,403,866 | 9/1983 | Falcoff et al. | 366/132 |
| 4,445,124 | 4/1984 | Fujii et al. | 346/75 |

FOREIGN PATENT DOCUMENTS

| | | | |
|---|---|---|---|
| 25075 | 8/1979 | European Pat. Off. | 106/20 |
| 48-55923 | 8/1973 | Japan | 106/22 |
| 56-22370 | 3/1981 | Japan | 210/656 |
| 1356121 | 6/1974 | United Kingdom | 106/20 |
| 1359898 | 7/1974 | United Kingdom | 106/20 |
| 1566948 | 9/1976 | United Kingdom | 106/20 |
| 2031448 | 4/1980 | United Kingdom | 106/20 |

OTHER PUBLICATIONS

Abstract of Japan Kokai No. 58-23859, published Feb. 12, 1983, Ricoh.
Snyder, Introduction to Modern Liquid Chromatography, Wiley & Sons, Inc., New York, 1979, pp. 519-522.

Primary Examiner—Ernest G. Therkorn
Attorney, Agent, or Firm—Fitzpatrick, Cella, Harper & Scinto

[57] ABSTRACT

A dyestuff refining system of a construction including a dyestuff solution producing unit and a dyestuff solution processing unit which performs chromatographic operations on the dyestuff solution.

8 Claims, 11 Drawing Figures

DYESTUFF REFINING SYSTEM

This application is a continuation of application Ser. No. 603,756, filed Apr. 25, 1984, now abandoned; and is related to application Ser. No. 594,704, filed Mar. 29, 1984; application Ser. No. 594,705, filed Mar. 29, 1984; application Ser. No. 603,755, filed Apr. 25, 1984; application Ser. No. 635,285, filed July 27, 1984; and application Ser. No. 635,503, filed July 27, 1984.

BACKGROUND OF THE INVENTION

1. Field of the Invention

This invention relates to a dyestuff refining system, and, more particularly, it is concerned with a dyestuff refining system capable of continuously supplying refined dyestuff which is suitable for preparing recording liquid (generally called "ink") adapted to ink jet recording, writing implements, and other uses.

2. Description of Prior Art

As the ink to be used for an ink jet recording system which implements recording of information by ejecting ink within a recording head through an ejection orifice by means of vibrations transmitted from a piezo-electric vibrator or other expedients, there have so far been known various dyestuffs and pigments which are dissolved or dispersed in a liquid medium such as water or other, organic solvents. There has also been known use of ink similar to the abovementioned one for those writing implements such as felt tip pens, fountain pens, etc.

One example of general basic ingredients for such ink may comprise principally the following three chief components: water-soluble dyestuff, water as the solvent for the dyestuff, and glycols as a desiccation-preventive agent.

The water-soluble dyestuff usually contains a large amount of inorganic salts such as sodium chloride, sodium sulfate, and so forth. These inorganic salts are the by-products formed in the course of the dye-synthesizing reaction, or are positively added as a salting-out agent, a diluent, or a level-dyeing agent.

When the recording ink is prepared with use of such dyestuff containing such inorganic salts, awkward situations would take place: the inorganic salts lower the dissolution stability of the dyestuff in the ink to bring about agglomeration and sedimentation of the dyestuff. Further, in the ink jet recording heads and writing implements, if and when the ink is evaporated in the vicinity of the ejection orifice causing the liquid composition to change, deposition of the inorganic salts is induced. These phenomena cause clogging at the discharge orifice, which should be avoided with the utmost of care.

In order therefore to eliminate such disadvantageous effects, it is necessary to control the inorganic salts concentration within a predetermined range when producing the ink (in general, it is to be limited to 0.5 wt. % or less with respect to the total ink composition). This control is indispensable when the dyestuff available in general market, which contains therein inorganic salts as impurities, is used for preparation of the ink for the ink jet recording as well as for the writing implements.

SUMMARY OF THE INVENTION

In view of the above-described point of problem, it is an object of the present invention to provide a dyestuff refining system which is capable of removing the inorganic salts contained in the dyestuff, when preparing ink, and of continuously feeding refined dyestuff solution suitable for preparation of the ink for the ink jet recording as well as for the writing implements.

According to the present invention, in the general aspect of it, there is provided a dyestuff refining system, comprising: means for producing dyestuff solution; and means for processing said dyestuff solution by execution of chromatography on said dyestuff solution, the processing means preferably separating inorganic salts from the dyestuff solution by means of chromatography.

BRIEF DESCRIPTION OF THE DRAWINGS

FIG. 1, comprising FIGS. 1A and 1B, is a schematic constructional diagram showing one embodiment of the dyestuff refining system according to the present invention;

FIG. 4, comprising FIGS. 4A and 4B is a block diagram snowing the control section in the system shown in FIG. 1; and FIG. 5, comprising of FIGS. 5A and 5B is a flow chart showing the sequential operations of the salt stripping unit in the system shown in FIG. 1.

DESCRIPTION OF THE PREFERRED EMBODIMENTS

In the following, the present invention will be described in detail in reference to the accompanying drawings.

Figures 1, 1A:
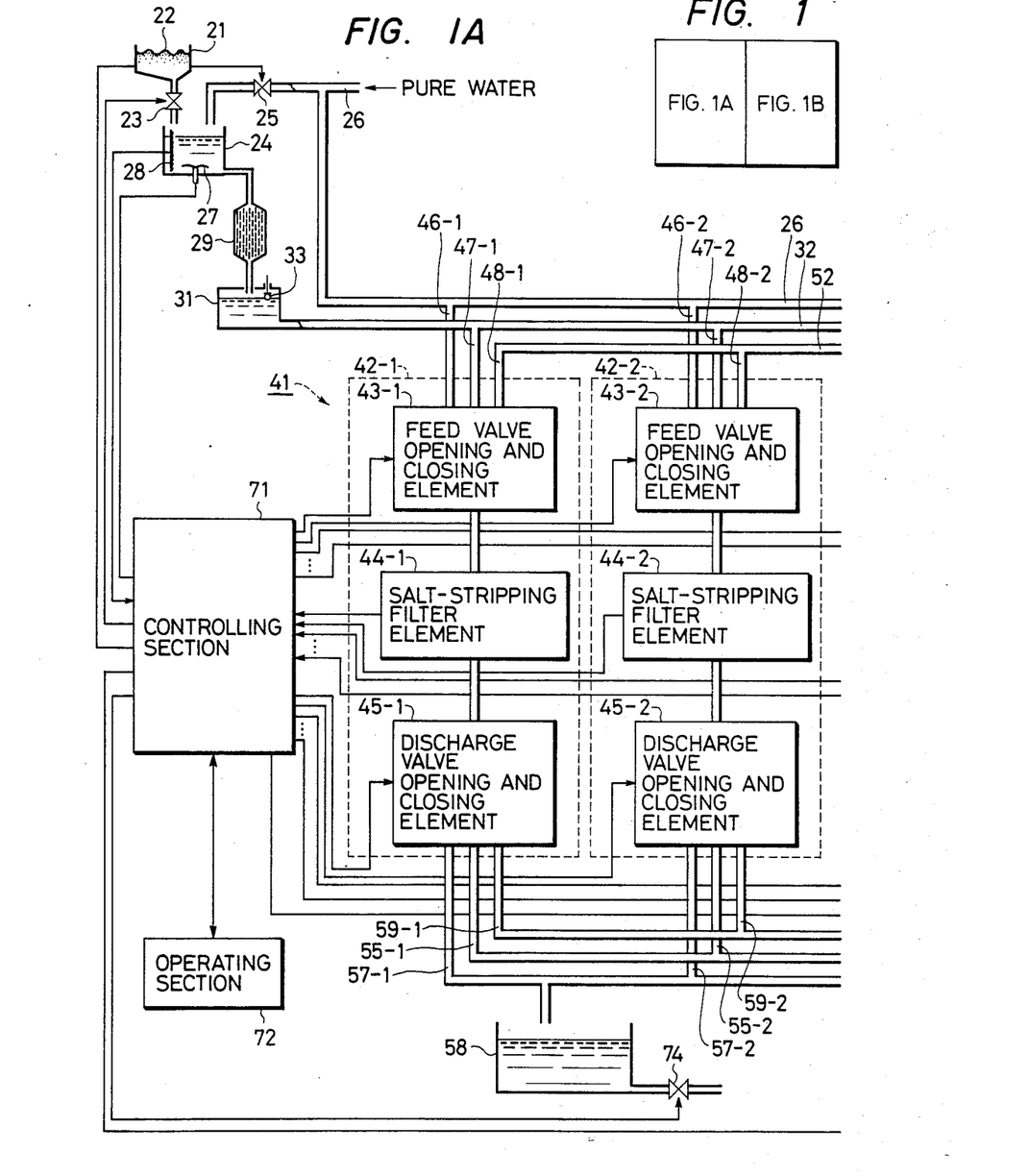
Figure 1B:
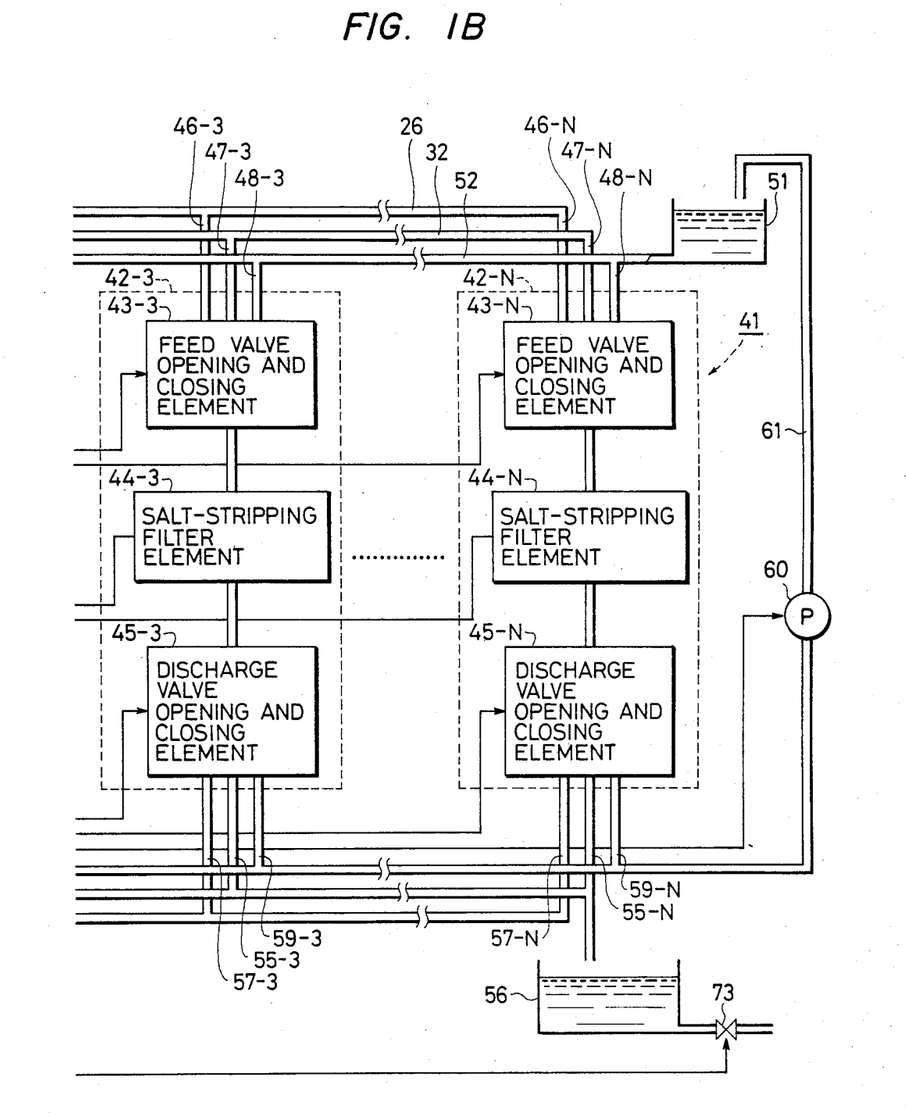

FIG. 1 shows one embodiment of the dyestuff refining system according to the present invention.

In the drawing, a reference numeral 21 designates a dyestuff feeding section storing therein dyestuff powder 22. The dyestuff powder 22 is fed from this dyestuff feeding section 21 into a preparation tank 24 through a dyestuff feeding valve 23. Also, into this preparation tank 24, pure water is supplied through a pure feeding pipe 26 having a pure water valve 25 interposed in one part thereof.

In this preparation tank 24, aqueous solution of dyestuff is prepared by mixing and dissolving the dyestuff powder 22 and the pure water by means of an agitator 27. The liquid quantity of the aqueous solution of dyestuff staying in the preparation tank 24 is detected by a liquid quantity sensor 28 set in the preparation tank. The aqueous solution of dyestuff obtained in the preparation tank contains therein, as the residue, particles of the dyestuff powder which have not been dissolved in the pure water. This residual dyestuff powder is removed by a filter 29. For the filter 29, there may be used ordinary filter paper or "FLUOROPORE" (a trade name of a product of Sumitomo Denko K.K., Japan, which is made up of polytetrafluoroethylene as the principal constituent), and so forth. The aqueous solution of dyestuff, from which the residual particles, etc. have been removed through the filter 29, is forwarded to a feeding tank 31.

The aqueous solution of dyestuff sent into the feeding tank 31 is further supplied to a refining section to be described in the following through a feeding pipe 32. A liquid level controlling valve 33 is disposed in this feeding tank 31 to maintain the quantity of the aqueous solution of dyestuff to be stored in it to a certain definite level or below.

A reference numeral 41 designates a refining section where the inorganic salts are removed from the aqueous solution of dyestuff. This refining section comprises a plurality of salt-stripping units 42 (42-1, . . . 42-N). In the salt-stripping units 42, a reference numeral 43 (43-1, . . . 43-N) designates feeding valve opening and closing elements, a numeral 44 (44-1, . . . 44-N) refers to salt-stripping filter elements, and 45 (45-1, . . . 45-N) denotes discharge valve opening and closing elements.

The feeding valve opening and closing elements 43 (43-1, . . . 43-N) are respectively connected with aqueous dyestuff solution feeding pipes 47 (47-1, . . . 47-N), pure water feeding pipes 46 (46-1, . . . 46-N) and secondary solution feeding pipes 48 (48-1, . . . 48-N). Into the feeding valve opening and closing elements 43 (43-1, . . . 43-N), the aqueous dyestuff solution is supplied from the feeding tank 31 through the feeding pipe 32 and the respective aqueous dyestuff solution feeding pipes 47 (47-1, . . . 47-N), and the pure water through the pure water feeding pipes 26 and 46 (46-1, . . . 46-N). Further, the secondary solution to be mentioned later is fed into the feeding valve opening and closing elements 43 (43-1, . . . 43-N) from a secondary solution storing tank 51 through a feeding pipe 52 and the respective secondary solution feeding pipes 48 (48-1, . . . 48-N).

At the feeding valve opening and closing element 43, control is done as to whether the dyestuff aqueous solution, pure water, and secondary solution as fed thereinto are to be sent into the salt-stripping filter element 44, or not.

The salt-stripping filter element 44 removes inorganic salts from the aqueous dyestuff solution and the secondary solution supplied thereinto through the feeding valve opening and closing element 43 by chromatography.

By controlling the discharge valve opening and closing element 45, the dyestuff aqueous solution, the inorganic salts concentration of which has become lower than a predetermined value (e.g., 5% by weight with respect to the dyestuff) by such refining (salt-stripping), is discharged into a storing tank 56 through discharge pipes 55 (55-1, . . . 55-N). Also, aqueous solution let out from the filter element 44 is discharged, depending on its component concentration, into an inorganic salts solution discharge tank 58 or into discharge pipes 59 (59-1, . . . 59-N).

One end of the discharge pipe 59 is communicatively connected with a suction port of a circulation pump 60, and the dyestuff aqueous solution let out into the discharge pipe 59 is forwarded under pressure by this circulation pump 60 into the secondary solution storing tank 51 through a discharge pipe 61 communicatively connected with an outlet port of the circulation pump 60. In this manner, the aqueous dyestuff solution which has been recovered from the discharge side of the refining section 41 is re-supplied to the refining section 41 as the secondary solution for further refining (salt-stripping).

A reference numeral 71 designates a control section which takes care of drive and control of each section. A numeral 72 refers to an operating section provided with various display units, drive switches, and so forth. 73 and 74 designate respectively valves disposed in the storing tanks 56 and 58, through which the aqueous dyestuff solution and the inorganic salts solution are discharged.

Figure 2:
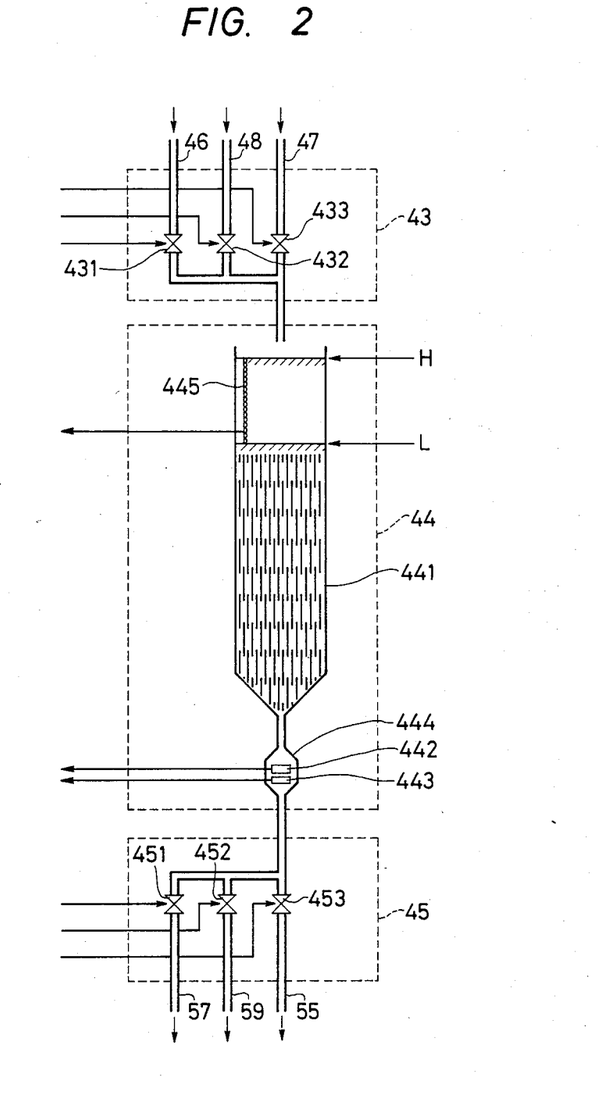
FIG. 2 is a schematic constructional diagram showing a salt-stripping unit in FIG. 1.

FIG. 2 illustrates the construction of the salt-stripping unit 42 shown in FIG. 1, wherein a first feeding valve 431 in the feeding valve opening and closing element 43 is controlled for its opening and closing to thereby regulate supply of pure water into the salt-stripping filter element 44 through the feeding pipe 46. In the same manner, by open-and-close control of a second feeding valve 432 and a third feeding valve 433, supply of the secondary solution and the dyestuff aqueous solution into each of the salt-stripping filter element 44 is regulated.

The salt-stripping filter elements 44 separate the inorganic salts from the dyestuff aqueous solution by chromatography. In more detail, the dyestuff aqueous solution is fed into the top end part of a chromatographic column 441 from the feeding valve opening and closing element 43. While the aqueous dyestuff solution as supplied is falling down within the chromatographic column 441, each of the components in the aqueous solution is fractionated. By this chromatographic development operation, those components having the lowest adsorbability flow out first. Accordingly, by detecting concentrations of the components in the effluent solution, it is possible to extract only the dyestuff aqueous solution with its inorganic salts concentration having been made lower than a predetermined concentration from the effluent solution on the basis of detection results.

An inorganic salts concentration sensor 442 and a dyestuff concentration sensor 443 are to detect concentration of the inorganic salts and the dyestuff in the effluent solution from the chromatographic column 441, and are disposed within an outflow liquid passage 444 at the bottom part of the column 441. For detecting the concentration of each component, there are various methods such as measurement of electrical conductivity, measurement of ion current, measurement of spectral light intensity, and others, any one of which will meet the purpose.

The refining (salt-stripping) operation is performed in such a manner that the dyestuff solution is fed into the chromatographic column 441 for every certain definite quantity thereof. For this purpose, a liquid surface level sensor 445 is disposed at the top end part of the column so as to control feeding of the aqueous solution from the feeding valve opening and closing element 43 on the basis of the detection results.

For a solid phase to be packed into this chromatographic column 441, there may generally be used an ion-exchange resin, a chelate resin, and so forth. In the embodiment of the present invention, an ion retarding resin such as, for example, "RETARDION 11A-8" (a tradename for a product of Dow Chemical Co.) is used. The ion retarding resin is capable of effecting regeneration of pure water without the necessity for any regenerating agents. Also, since the resin is almost neutral, it can be advantageously used for salt-stripping of those substances which are unstable to acid and alkali.

Figure 3:
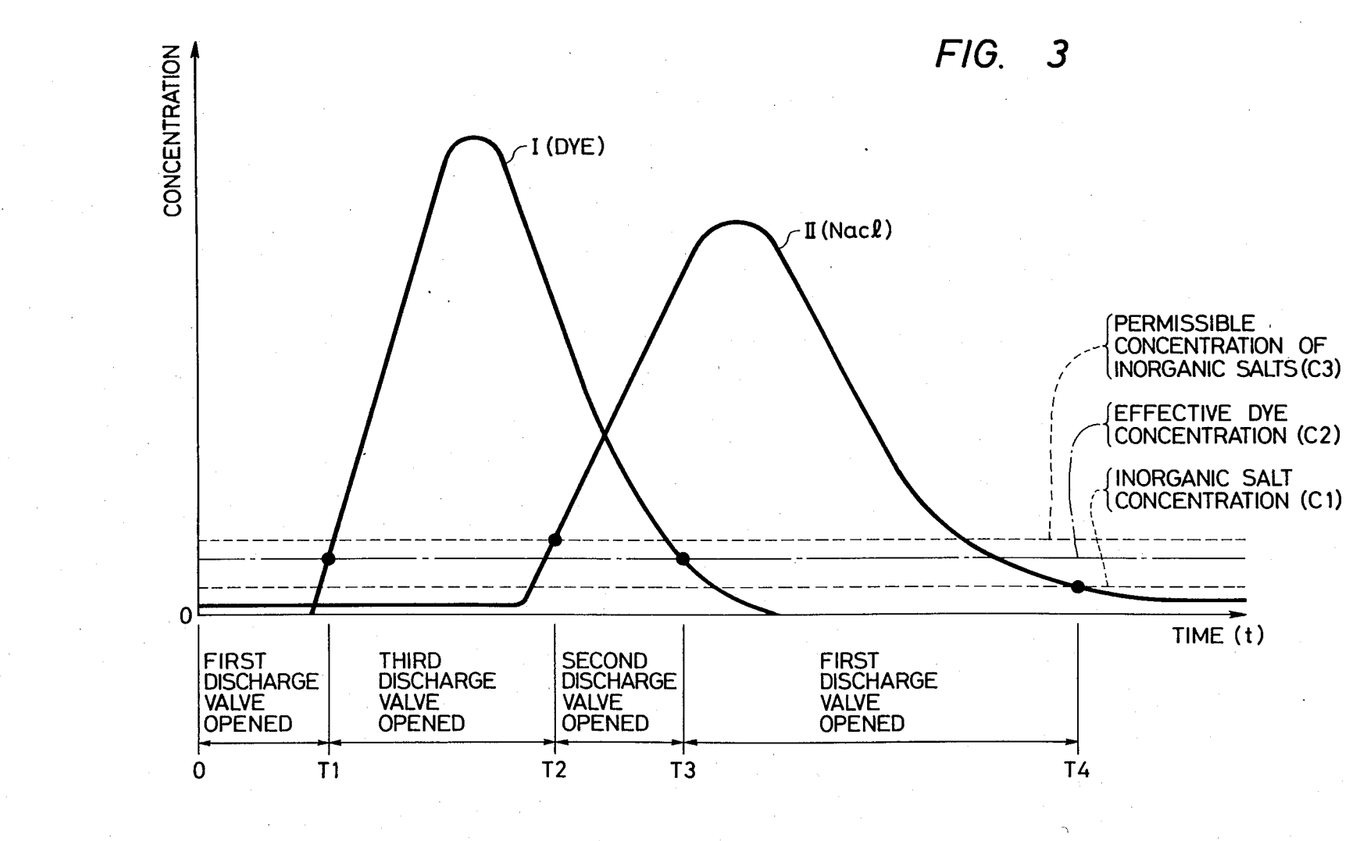
FIG. 3 is a graphical representation showing fractionation characteristics of a chromatographic column.

FIG. 3 is a graphical representation showing effluent curves drawn by plotting the concentration of each component in the effluent solution from the chromatographic column 441 with respect to time (i.e., fractionating characteristics). As shown in this graphical representation, the dyestuff concentration (curve I) indicates its peak during a time period of from T1 to T2, while the inorganic salts concentration (curve II) indicates its peak during a time period of from T3 to T4. In this embodiment, the fractionation of the effluent solution from the chromatographic column 441 is carried out by the detected values of the inorganic salts concentration sensor 442 and the dyestuff concentration sensor 443 in utilization of the abovementioned fractionating characteristics.

That is to say, in case the dyestuff concentration in the effluent solution is higher than a predetermined value C2 (effective dyestuff concentration) and the inorganic salts concentration is below a predetermined value C3 (permissible inorganic salts concentration) (the time period of from T1 to T2), the effluent solution is introduced into the storing tank 56. However, when the inorganic salts concentration exceeds the value C3 and the dyestuff concentration becomes lower than the value C2, the effluent solution is introduced into the inorganic salts solution discharging tank 58. On the other hand, during a time period wherein the inorganic salts concentration becomes higher than the value C3 and the dyestuff concentration is higher than the value C2 (a time period of from T2 to T3), the effluent solution is refluxed into the secondary solution storing tank 51.

Returning to FIG. 2, the discharge valve opening and closing element 45 is to perform segregation of the effluent solution as mentioned in the foregoing, for which purpose the outflow liquid passage 444 is branched into three ways, and the branch pipes and the discharge pipes 57, 59 and 55 are communicatively connected through the first, second and third discharge valves 451, 452 and 453, respectively. With such construction, the effluent solution can be discharged into the inorganic salts solution discharge tank 58 by opening the first discharge valve 451, and, in the same manner, the effluent solution can also be led into the secondary solution storing tank 51 and the storing tank 56 by opening the second and third discharge valves 452 and 453.

Figures 4, 4A:
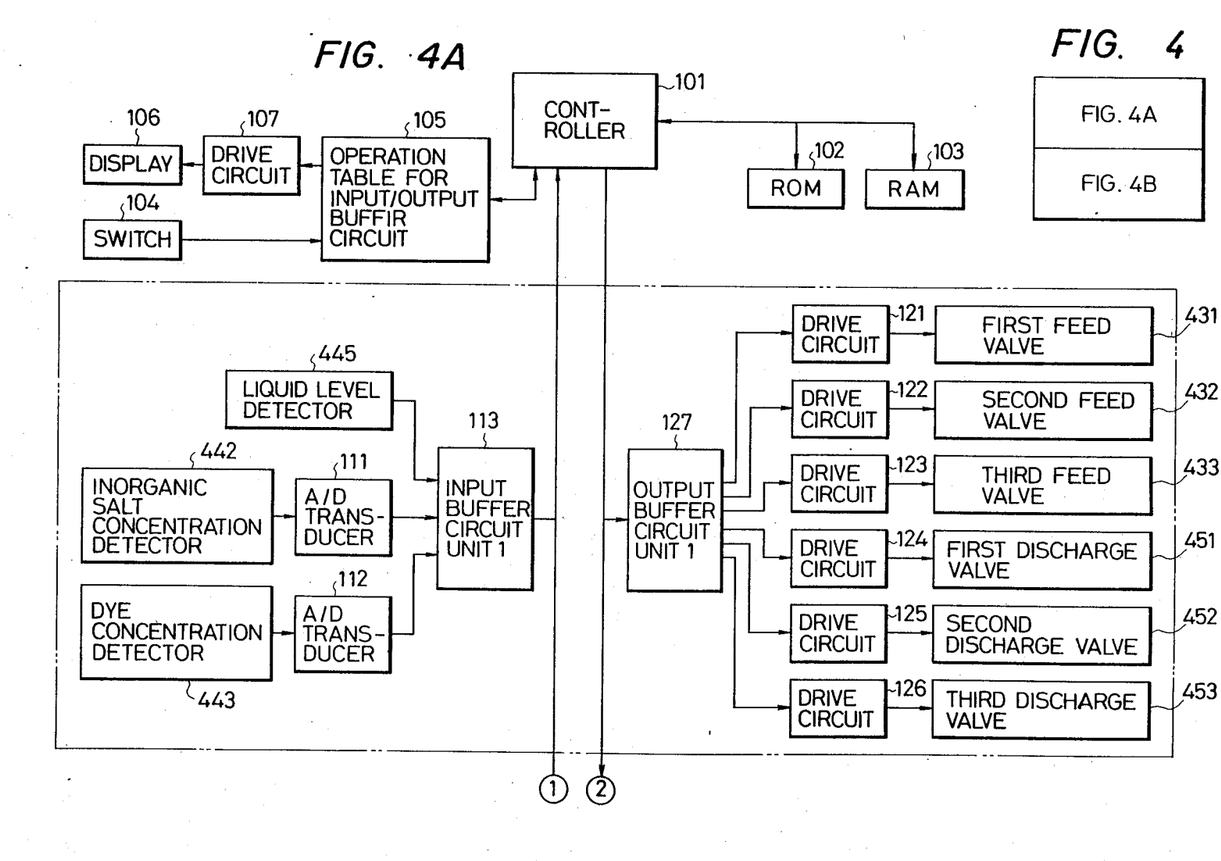
Figure 4B:
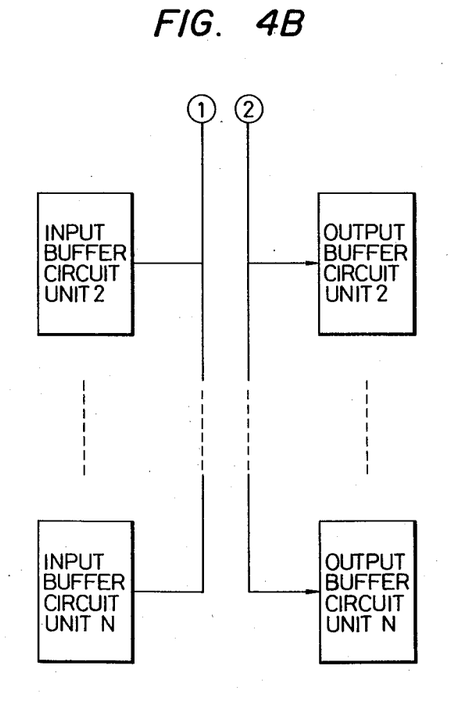
Figures 5, 5A:
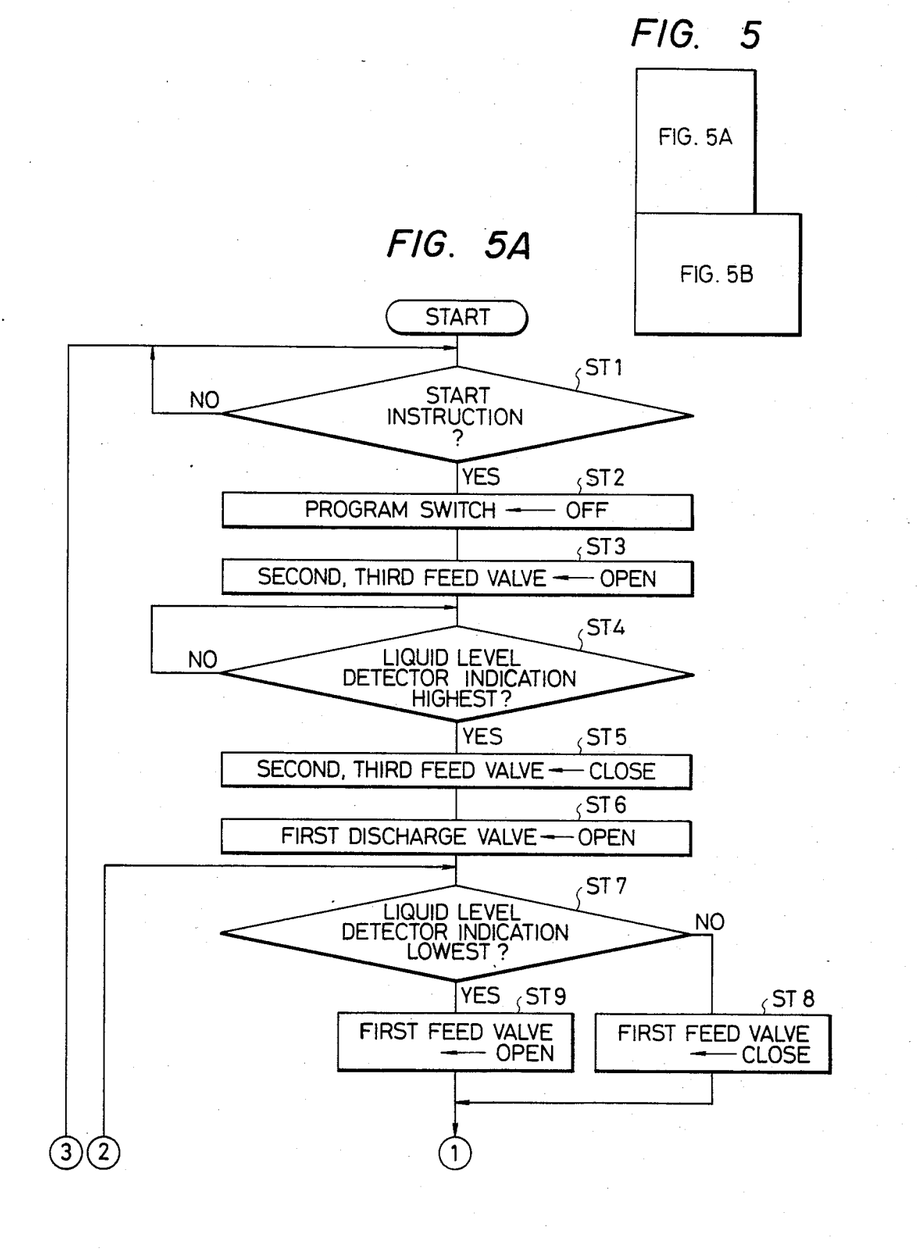
Figure 5B:
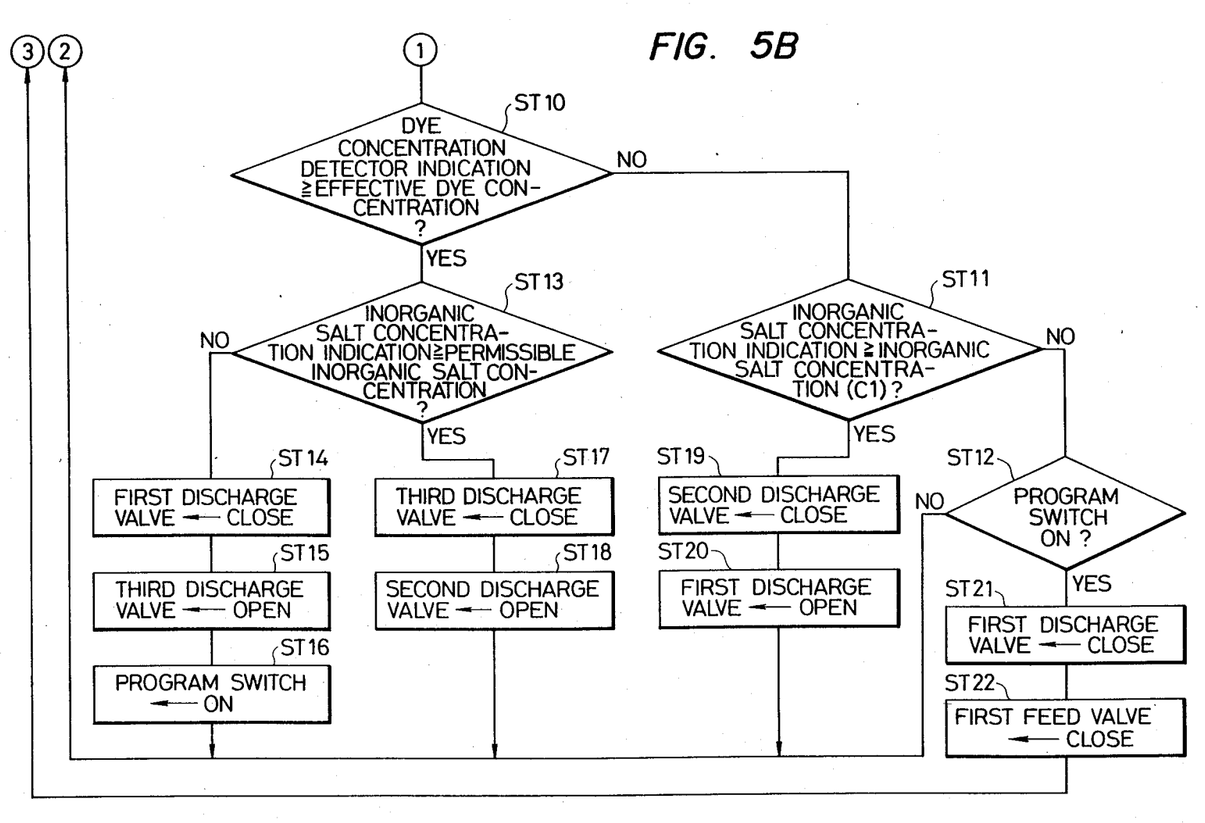

FIG. 4 is a block diagram for the control section of the refining system according to the present invention shown in FIG. 1, in which a reference numeral 101 designates a controller to undertake the drive-control of every section in the system, a numeral 102 refers to a read-only memory (ROM) storing therein control programs such as the operational sequences, etc. as shown in FIG. 5, and a numeral 103 refers to a random-access memory (RAM) temporarily storing therein various data.

A reference numeral 104 designates various switches disposed in the operating section 72, which sends various instruction signals to the controller 101 through the input/output buffer circuit 105. A numeral 106 refers to a display device also disposed in the operating section 72. A reference numeral 107 indicates a drive circuit to perform the display control of the display device 106 based on the drive signals from the controller 101.

In the present embodiment, analog signals are output from the inorganic salts concentration sensor 442 and the dyestuff concentration sensor 443, and, after these signals are converted into the digital signals through the respective A/D converters 111 and 112, respectively, they are fed into the controller 101 through an input buffer circuit 113. On the other hand, digital signals are output from the liquid surface level sensor 445 and are also fed into the controller 101 through the input buffer circuit 113.

Reference numerals 121 through 126 designate drive circuits to open and close the afore-mentioned valves 431, 432, 433, 451, 452, and 453, respectively. These drive circuits are "on-off" controlled by drive signals supplied from the controller 101 through an output buffer circuit 127.

By the way, since the salt-stripping units 42-1 to 42-N are of the identical construction, the unit 42-1 alone is shown in the drawing, the remaining units 42-2 to 42-N being omitted from the illustration.

FIG. 5 is a flow chart showing the operations of each processing unit in the embodiment of the dyestuff refining system of the construction as described in the foregoing.

In the drawing, at the start instruction from the operating section 72 in step ST1, the program switch is set in its "off" condition in step ST2. Subsequently, in step ST3, the second and third feeding valves 432 and 433 are opened to start feeding the dyestuff aqueous solution in the feeding tank 31 and the secondary solution in the secondary solution storing tank 51 into the chromatographic column 441. These feeding operations are continued in step ST4 until the liquid surface level in the chromatographic column 441 reaches the highest position H (refer to FIG. 2) by an output from the liquid surface level sensor 445. As soon as the liquid surface level H reaches the highest position, i.e., as soon as a predetermined quantity of the aqueous solution has been supplied into the chromatographic column, the operational sequence proceeds to step ST5, where both feeding valves 432 and 433 are closed. Next, in step ST6, the first discharge valve 451 is opened, whereby the effluent solution from the chromatographic column 441 begins to be discharged into the inorganic salts solution discharge tank 58.

In step ST7, determination is made as to whether the liquid surface level in the column is at the lowest position L (refer to FIG. 2), or not. In a state immediately after feeding of the aqueous dyestuff solution and the secondary solution, the liquid surface level is above the lowest level L, so that the negative determination ("No") is made, and the operational sequence proceeds to step ST8. In the step ST8, the first feeding valve 431 is closed, and the operational sequence goes to step ST10 where the dyestuff aqueous solution and the secondary solution are supplied as mentioned above. Immediately after commencement of the chromatographic development within the chromatographic column 441, the concentration of each component in the effluent solution is in the state as shown in FIG. 3 between time zero and T1. Accordingly, in the step ST10, the determination as to whether the concentration value detected by the dyestuff concentration sensor 443 is higher than the effective dyestuff concentration value C2, or not, comes out "No", and the operational sequence proceeds to step ST11. In the ST11, the determination as to whether the concentration value detected by the inorganic salts concentration sensor 442 is higher than the inorganic salts concentration value C1, or not, comes as "No", and the operational sequence proceeds to step ST12. In the step ST12, determination is made as to whether the program switch is in its "on" state, or not. In the first processing loop, the program switch is in the "off" state, so that the determination comes out as "No", and the operational sequence returns to the step ST7. In this manner, the processing loop of ST7, ST8, ST10, ST11, and ST12 is repeated until the determination is made "Yes" at the step ST10.

At the step ST7, when the determination comes out as "Yes", the operational sequence proceeds to the step ST9, whereby the first feeding valve 431 is opened and the pure water is fed into the chromatographic column 441. As the result of this, the processing loop in such case goes through ST7, ST9, ST10, ST11, and ST12.

In the step ST10, when the dyestuff concentration value of the effluent solution from the chromatographic column 441 becomes higher than the effective dyestuff concentration value C2 (refer to FIG. 3, time T1), the operational sequence proceeds to step ST13. In the step ST13, the determination is made as to whether the inorganic salts concentration value detected by the inorganic salts concentration sensor 442 is higher than the permissible inorganic salts concentration value C3, or not.

Here, owing to the chromatographic development operations in the chromatographic column 441, the dyestuff aqueous solution from which the organic salts have been separated from it flows out first (refer to FIG. 3, time T1 to T2). Accordingly, the determination in the step ST13 comes out as "No", and the operational sequence proceeds to step ST14. In the step ST14, the first discharge valve 451 is closed, while, in step ST15, the third discharge valve 453 is opened, whereby the effluent solution from the chromatographic column 441 passes through the discharge pipe 55 and discharged into the storing tank 56. Subsequently, the program switch is turned on at the step ST16, and the operational sequence returns to the step ST7. Thus, by repetition of the processing loop of ST7, ST8, ST10, ST13, ST14, ST15, and ST16 or ST7, ST9, ST10, ST13, ST14, ST15, and ST16, there can be obtained in the storing tank 56 the dyestuff aqueous solution with reduced inorganic salts concentration lower than the permissible concentration value C3. Such processing loop is repeated until the determination comes out as "Yes" in the step ST13.

As shown in FIG. 3, when the outflow of the inorganic salts begins, and the inorganic salts concentration in the effluent solution increases to a value higher than the permissible inorganic salts concentration value C3 (vide: FIG. 3, time T2), the operational sequence proceeds from the step ST13 to the step ST17 so as to close the third discharge valve 453 and to open the second discharge valve 452 in step ST18. As the result of this, the effluent solution is kept from discharging into the storing tank 56, and, instead, it is let out into the discharge pipe 59. In this embodiment, if it is assumed that the circulation pump 60 is driven in synchronism with the opening operation of the valve 452, the effluent solution is discharged into the secondary solution storing tank 51 through the discharge pipes 59 and 61. The reflux of such effluent solution continues until the determination comes out as "No" in the step ST10. The secondary solution recovered as such is again subjected to refinement for the salt-stripping. Next, when the dyestuff concentration in the effluent solution lowers and the value becomes lower than the effective dyestuff concentration value C2 (vide: FIG. 3, time T3), the determination comes out as "No" in the step ST10, and the operational sequence proceeds to the step ST11. At this stage, since the inorganic salts continues to flow out, the determination comes out as "Yes" in the step ST11, and the operational sequence proceeds to the step ST19 where the second discharge valve 452 is closed, and further the first discharge valve 451 is opened at step ST20. As the result of this, reflux of the effluent solution to the secondary solution storing tank 51 is stopped, and it begins to be discharged into the inorganic salts solution storing tank 58 through the discharge pipe 59. Such discharging operation continues until the inorganic salts concentration in the effluent solution becomes lower than the inorganic salts concentration value C1.

When the inorganic salts concentration becomes lower than the value C1 (vide: FIG. 3, time T4), the determination comes out as "No" in the step ST11, and the operational sequence proceeds to the step ST12. At this stage, since the program switch has already been set in its "on" state in the step ST16, as mentioned in the foregoing, the determination comes out as "Yes" in the step ST12, and the operational sequence proceeds to step ST21 where the first discharge valve 451 is closed and the discharge of the effluent solution into the discharge tank 58 is completed.

Next, in step ST22, the feeding valve 431 is closed and the supply of pure water into the chromatographic column 441 is stopped. That is to say, in this embodiment, the first feeding valve 431 is controlled for its opening and closing so that the liquid surface level of the aqueous solution in the chromatographic column 441 may always be at the lowest position (cf. FIG. 2), whereby pure water is supplied (steps ST8 and ST9). With the supply of pure water, the solid phase in the chromatographic column is washed (regenerated). As mentioned in the foregoing, when the inorganic salts concentration in the effluent solution becomes lower than the inorganic salts concentration value C1, it is determined that the washing (or regeneration) has been effected, and the pure water feeding is stopped.

After execution of the step ST22, the operational sequence goes back again to the step ST1 to wait for the start instruction.

In the above-described manner, the first cycle of the refining operations (salt-stripping operations) terminates. Incidentally, the operations in each of the processing units 42-1 to 42-N in this embodiment are performed in synchronism one another. However, the invention is not limited to this embodiment alone, but it may also be feasible to execute the processing operations in the sequential manner.

In this embodiment, too, the secondary solution as recovered is refined in each processing unit 42. It should, however, be noted that separate processing unit for the secondary solution may be provided to effect the refining.

As described in the foregoing, according to the present invention, since inorganic salts contained in the dyestuff solution are eliminated by the chromatographic refining method in preparing salt-free dyestuff solution, it is possible to produce the refined dyestuff solution suitable for preparing ink for the ink jet recording or writing implements. Furthermore, according to the present invention, such refined dyestuff solution can be manufactured continuously and automatically, so that industrialized mass production of high quality dyestuff solution becomes possible.

We claim:

1. A dyestuff solution refining system to purify an aqueous dyestuff solution containing inorganic salt contaminant comprising:
preparation means for producing a dyestuff solution;
refining means including (a) a chromatographic means for removing inorganic salt contaminant from said dyestuff solution; (b) transfer means for transferring said dyestuff solution to said chromatographic means; (c) discharge means for discharging said dyestuff solution from said chromatographic means; and (d) inorganic salt sensor means for detecting the inorganic salt concentration in said discharged dyestuff solution and for generating an output responsive to said detected inorganic salt concentration;

control means including (i) comparison means for receiving said output from said inorganic salt sensor means, for comparing said output with a predetermined value, and for generating an output responsive to differences between said detected inorganic salt concentration and said predetermined value, (ii) fractionation means for fractionating said discharged dyestuff solution in response to said output from said comparison means into a portion having an inorganic salt concentration at or below said predetermined value and a portion having an inorganic salt concentration above said predetermined value; and (iii) circulation means for recycling said discharged dyestuff solution portion having an inorganic salt concentration above said predetermined value to said chromatographic means; and a reservoir for collecting said discharged dyestuff solution portion having an inorganic salt concentration at or below said predetermined value.

2. A dyestuff solution refining system to purify an aqueous dyestuff solution containing inorganic salt contaminant comprising:

preparation means for producing a dyestuff solution;

refining means including (a) a chromatographic means for removing inorganic salt contaminant from said dyestuff solution; (b) transfer means for transferring said dyestuff solution to said chromatographic means; (c) discharge means for discharging said dyestuff solution from said chromatographic means; (d) inorganic salt sensor means for detecting the inorganic salt concentration in said discharged dyestuff solution and for generating an output responsive to said detected inorganic salt concentration; and (e) dyestuff sensor means for detecting the dyestuff concentration in said discharged dyestuff solution and for generating an output responsive to said detected dyestuff concentration;

control means including (i) a first comparison means for receiving said output from said inorganic salt sensor means, for comparing said output with a predetermined salt value, and for generating an output responsive to differences between said detected inorganic salt concentration and said predetermined salt value, (ii) a second comparison means for receiving said output from said dyestuff sensor means, for comparing said output with a predetermined dyestuff value and for generating an output responsive to differences between said detected dyestuff concentration and said predetermined dyestuff value; (iii) fractionation means for fractionating said discharged dyestuff solution in response to said outputs from said first and second comparison means into a portion having an inorganic salt concentration at or below said predetermined salt value and a dyestuff concentration at or below said predetermined dyestuff value, a portion having an inorganic salt concentration at or below said predetermined salt value and a dyestuff concentration above said predetermined dyestuff value, a portion having an inorganic salt concentration above a predetermined salt value and a dyestuff concentration above said predetermined dyestuff value, and a portion having an inorganic salt concentration above said predetermined salt value and a dyestuff concentration at or below said predetermined dyestuff value; (iv) circulation means for recycling said discharged dyestuff solution portion having an inorganic salt concentration above said predetermined salt value and a dyestuff concentration above sid predetermined dyestuff value to said chromatographic means; and (v) an effluent means for removing both said discharged dyestuff solution portions having a dyestuff concentration at or below said predetermined dyestuff value; and a reservoir for collecting said discharged dyestuff solution portion having an inorganic salt concentration at or below said predetermined salt value and a dyestuff concentration above said predetermined dyestuff value.

3. A dyestuff solution refining system to purify an aqueous dyestuff solution containing inorganic salt contaminant comprising:

preparation means for producing a dyestuff solution;

refining means including (a) a plurality of chromatographic means in parallel series for removing inorganic salt contaminant from said dyestuff solution; (b) transfer means for transferring said dyestuff solution to each of said chromatographic means; (c) discharge means for discharging said dyestuff solution from each of said chromatographic means; and (d) inorganic salt sensor means for detecting the inorganic salt concentration in said discharged dyestuff solution and for generating an output responsive to said detected inorganic salt concentration;

control means including (i) comparison means for receiving said output from said inorganic salt sensor means, for comparing said output with a predetermined value, and for generating an output responsive to differences between said detected inorganic salt concentration and said predetermined value, (ii) fractionation means for fractionating said discharged dyestuff solution in response to said output from said comparison means into a portion having an inorganic salt concentration at or below said predetermined value and a portion having an inorganic salt concentration above said predetermined value; and (iii) circulation means for recycling said discharged dyestuff solution portion having an inorganic salt concentration above said predetermined value to said chromatographic means; and a reservoir for collecting said discharged dyestuff solution portion having an inorganic salt concentration at or below said predetermined value.

4. A dyestuff solution refining system to purify an aqueous dyestuff solution containing inorganic salt contaminant comprising:

preparation means for producing a dyestuff solution;

refining means including (a) a plurality of chromatographic means in parallel series for removing inorganic salt contaminant from said dyestuff solution; (b) transfer means for transferring said dyestuff solution to each of said chromatographic means; (c) discharge means for discharging said dyestuff solution from each of said chromatographic means; (d) inorganic salt sensor means for detecting the inorganic salt concentration in said discharged dyestuff solution and for generating an output responsive to said detected inorganic salt concentration; and (e) dyestuff sensor means for detecting the dyestuff concentration in said discharged dyestuff solution and for generating an output responsive to said detected dyestuff concentration;

control means including (i) a first comparison means for receiving said output from said inorganic salt sensor means, for comparing said output with a predetermined salt value, and for generating an output responsive to differences between said detected inorganic salt concentration and said predetermined salt value, (ii) a second comparison means for receiving said output from said dyestuff sensor means, for comparing said output with a predetermined dyestuff value and for generating an output responsive to differences between said detected dyestuff concentration and said predetermined dyestuff value; (iii) fractionation means for fractionating said discharged dyestuff solution in response to said outputs from said first and second comparison means into a portion having an inorganic salt concentration at or below said predetermined salt value and a dyestuff concentration at or below said predetermined dyestuff value, a portion having an inorganic salt concentration at or below said predetermined salt value and a dyestuff concentration above said predetermined dyestuff value, a portion having an inorganic salt concentration above a predetermined salt value and a dyestuff concentration above said predetermined dyestuff value, and a portion having an inorganic salt concentration above said predetermined salt value and a dyestuff concentration at or below said predetermined dyestuff value; (iv) circulation means for recycling said discharged dyestuff solution portion having an inorganic salt concentration above said predetermined salt value and a dyestuff concentration above said predetermined dyestuff value to said chromatographic means, and (v) an effluent means for removing both said discharged dyestuff solution portions having a dyestuff concentration at or below said predetermined dyestuff value; and a reservoir for collecting said discharged dyestuff solution portion having an inorganic salt concentration at or below said predetermined salt value and a dyestuff concentration above said predetermined dyestuff value.

5. A dyestuff solution producing system to produce an aqueous dyestuff solution from a dyestuff containing inorganic salt contaminant comprising:

preparation means for producing an aqueous dyestuff solution;

feeding means for feeding dyestuff containing inorganic salt contaminant to said preparation means;

supply means for supplying water to said preparation means;

refining means including (a) a chromatographic means for removing inorganic salt contaminant from said dyestuff solution; (b) transfer means for transferring said dyestuff solution to said chromatographic means; (c) discharge means for discharging said dyestuff solution from said chromatographic means; and (d) inorganic salt sensor means for detecting the inorganic salt concentration in said discharged dyestuff solution and for generating an output responsive to said detected inorganic salt concentration;

control means including (i) comparison means for receiving said output from said inorganic salt sensor means, for comparing said output with a predetermined value, and for generating an output responsive to differences between said detected inorganic salt concentration and said predetermined value; (ii) fractionation means for fractionating said discharged dyestuff solution in response to said output from said comparison means into a portion having an inorganic salt concentration at or below said predetermined value and a portion having an inorganic salt concentration above said predetermined value; and (iii) circulation means for recycling said discharged dyestuff solution portion having an inorganic salt concentration above said predetermined value to said chromatographic means; and a reservoir for collecting said discharged dyestuff solution portion having an inorganic salt concentration at or below said predetermined value.

6. A dyestuff solution producing system to produce an aqueous dyestuff solution from a dyestuff containing inorganic salt contaminant comprising:

preparation means for producing an aqueous dyestuff solution;

feeding means for feeding dyestuff containing inorganic salt contaminant to said preparation means;

supply means for supplying water to said preparation means;

refining means including (a) a chromatographic means for removing inorganic salt contaminant from said dyestuff solution; (b) transfer means for transferring said dyestuff solution to said chromatographic means; (c) discharge means for discharging said dyestuff solution from said chromatographic means; (d) inorganic salt sensor means for detecting the inorganic salt concentration in said discharged dyestuff solution and for generating an output responsive to said detected inorganic salt concentration; and (e) dyestuff sensor means for detecting the dyestuff concentration in said discharged dyestuff solution and for generating an output responsive to said detected dyestuff concentration;

control means including (i) a first comparison means for receiving said output from said inorganic salt sensor means, for comparing said output with a predetermined salt value, and for generating an output responsive to differences between said detected inorganic salt concentration and said predetermined salt value, (ii) a second comparison means for receiving said output from said dyestuff sensor means, for comparing said output with a predetermined dyestuff value and for generating an output responsive to differences between said detected dyestuff concentration and said predetermined dyestuff value; (iii) fractionation means for fractionating said discharged dyestuff solution in response to said outputs from said first and second comparison means into a portion having an inorganic salt concentration at or below said predetermined salt value and a dyestuff concentration at or below said predetermined dyestuff value, a portion having an inorganic salt concentration at or below said predetermined salt value and a dyestuff concentration above said predetermined dyestuff value, a portion having an inorganic salt concentration above a predetermined salt value and a dyestuff concentration above said predetermined dyestuff value, and a portion having an inorganic salt concentration above said predetermined salt value and a dyestuff concentration at or below said predetermined dyestuff value; (iv) circulation means for recycling said discharged dyestuff solution portion having an inorganic salt concentration above said predetermined salt value and a dyestuff concentration above said predetermined dyestuff value to said chromatographic means; and (v) an effluent means for removing both said discharged dyestuff solution portions having a dyestuff concentration at or below said predetermined dyestuff value; and a reservoir for collecting said discharged dyestuff solution portion having an inorganic salt concentration at or below said predetermined salt value and a dyestuff concentration above said predetermined dyestuff value.

7. A dyestuff solution producing system to produce an aqueous dyestuff solution from a dyestuff containing inorganic salt contaminant comprising:

preparation means for producing a dyestuff solution;
feeding means for feeding dyestuff containing inorganic salt contaminant to said preparation means;
supply means for supplying water to said preparation means;
refining means including (a) a plurality of chromatographic means in parallel series for removing inorganic salt contaminant from said dyestuff solution; (b) transfer means for transferring said dyestuff solution to each of said chromatographic means; (c) discharge means for discharging said dyestuff solution from each of said chromatographic means; and (d) inorganic salt sensor means for detecting the inorganic salt concentration in said discharged dyestuff solution and for generating an output responsive to said detected inorganic salt concentration;

control means including (i) comparison means for receiving said output from said inorganic salt sensor means, for comparing said output with a predetermined value, and for generating an output responsive to differences between said detected inorganic salt concentration and said predetermined value, (ii) fractionation means for fractionating said discharged dyestuff solution in response to said output from said comparison means into a portion having an inorganic salt concentration at or below said predetermined value and a portion having an inorganic salt concentration above said predetermined value; and (iii) circulation means for recycling said discharged dyestuff solution portion having an inorganic salt concentration above said predetermined value to said chromatographic means; and a reservoir for collecting said discharged dyestuff solution portion having an inorganic salt concentration at or below said predetermined value.

8. A dyestuff solution producing system to produce an aqueous dyestuff solution from a dyestuff containing inorganic salt contaminant comprising:

preparation means for producing a dyestuff solution;
feeding means for feeding dyestuff containing inorganic salt contaminant to said preparation means;
supply means for supplying water to said preparation means;
refining means including (a) a plurality of chromatographic means in parallel series for removing inorganic salt contaminant from said dyestuff solution; (b) transfer means for transferring said dyestuff solution to each of said chromatographic means; (c) discharge means for discharging said dyestuff from each of said chromatographic means; (d) inorganic salt sensor means for detecting the inorganic salt concentration in said discharged dyestuff solution and for generating an output responsive to said detected inorganic salt concentration; and (e) dyestuff sensor means for detecting the dyestuff concentration in said discharged dyestuff solution and for generating an output responsive to said detected dyestuff concentration;

control means including (i) a first comparison means for receiving said output from said inorganic salt sensor means, for comparing said output with a predetermined salt value, and for generating an output responsive to differences between said detected inorganic salt concentration and said predetermined salt value, (ii) a second comparison means for receiving said output from said dyestuff sensor means, for comparing said output with a predetermined dyestuff value and for generating an output responsive to differences between said detected dyestuff concentration and said predetermined dyestuff value; (iii) fractionation means for fractionating said discharged dyestuff solution in response to said outputs from said first and second comparison means into a portion having an inorganic salt concentration at or below said predetermined salt value and a dyestuff concentration at or below said predetermined dyestuff value, a portion having an inorganic salt concentration at or below said predetermined salt value and a dyestuff concentration above said predetermined dyestuff value, a portion having an inorganic salt concentration above a predetermined salt value and a dyestuff concentration above said predetermind dyestuff value, and a portion having an inorganic salt concentration above said predetermined salt value and a dyestuff concentration at or below said predetermined dyestuff value; (iv) circulation means for recycling said discharged dyestuff solution portion having an inorganic salt concentration above said predetermined salt value and a dyestuff concentration above said predetermined dyestuff value to said chromatographic means; and (v) an effluent means for removing both said discharged dyestuff solution portions having a dyestuff concentration at or below said predetermined dyestuff value; and a reservoir for collecting said discharged dyestuff solution portion having an inorganic salt concentration at or below said predetermined salt value and a dyestuff concentration above said predetermined dyestuff value.

* * * * *

UNITED STATES PATENT AND TRADEMARK OFFICE
CERTIFICATE OF CORRECTION

PATENT NO. : 4,698,151
DATED : October 6, 1987
INVENTOR(S) : KUNITAKA OZAWA, ET AL.

It is certified that error appears in the above-identified patent and that said Letters Patent is hereby corrected as shown below:

COLUMN 2

Line 22, "snowing" should read --showing--.
Line 40, "pure feeding" should read --pure water feeding--.

COLUMN 4

Line 8, "element" should read --elements--.

COLUMN 6

Line 52, "the ST11," should read --the step ST11,--.

COLUMN 7

Line 23, "and discharged" should read --and is discharged--.

COLUMN 8

Line 36, "synchronism one" should read --synchronism with one--.

COLUMN 10

Line 7, "sid" should read --said--.

UNITED STATES PATENT AND TRADEMARK OFFICE
CERTIFICATE OF CORRECTION

PATENT NO. : 4,698,151            Page 2 of 2

DATED : October 6, 1987

INVENTOR(S) : KUNITAKA OZAWA, ET AL.

It is certified that error appears in the above-identified patent and that said Letters Patent is hereby corrected as shown below:

COLUMN 14

Line 10, "dyestuff" should read --dyestuff solution--.
Line 44, "predetermind" should read --predetermined--.

Signed and Sealed this

Seventeenth Day of May, 1988

Attest:

DONALD J. QUIGG

*Attesting Officer*         *Commissioner of Patents and Trademarks*